Nov. 16, 1937. W. H. RINGE Re. 20,554

TRAVELING HOIST

Original Filed April 3, 1936

INVENTOR.
WILLIAM H. RINGE
BY Miller Boyken & Brind
ATTORNEY.

Reissued Nov. 16, 1937

Re. 20,554

UNITED STATES PATENT OFFICE 20,554

TRAVELING HOIST

William H. Ringe, Berkeley, Calif.

Original No. 2,061,044, dated November 17, 1936, Serial No. 72,547, April 3, 1936. Application for reissue August 9, 1937, Serial No. 158,230

6 Claims. (Cl. 212—126)

This invention relates to traveling cranes or hoists of the type used in shops and warehouses, and has for its principal object improvements in such cranes whereby an operator in control of all of the movements of the hoist, both vertically as well as horizontally, rides at all times adjacent the hook, grab, or other load-carrying device for constant close supervision of its operations, yet is carried on a rope separate from the load-carrying rope or ropes and therefore free from danger in case of parting of the load-carrying rope, slipping of the slings, loads, etc.

Other objects and advantages of the invention will appear in the following description and accompanying drawing.

In the drawing Fig. 1 is an elevation of a traveling crane equipped with my improvements.

Figures 1, 2, 3:
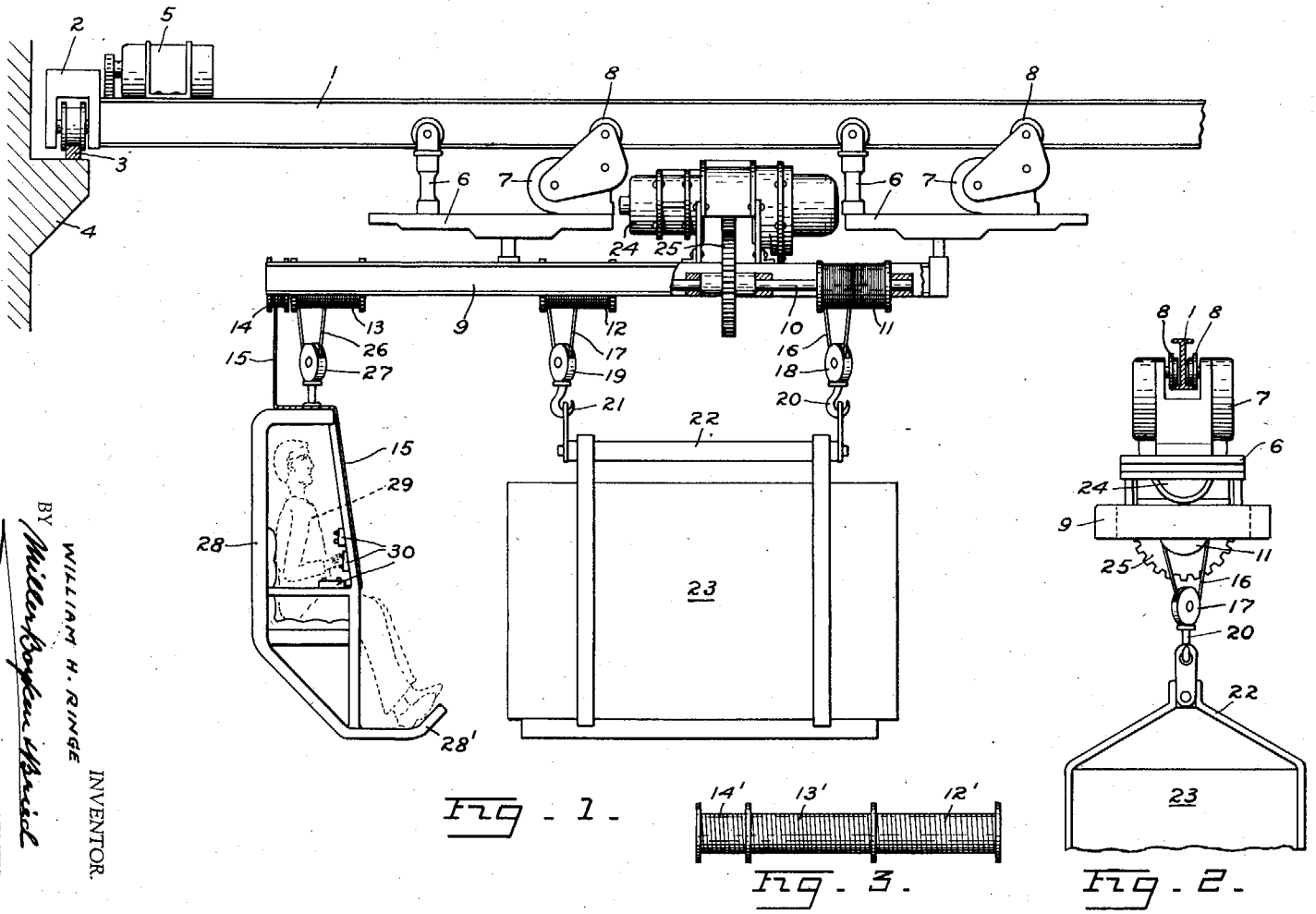
Fig. 2 is an end view of the upper portion of the hoist mechanism.
Fig. 3 shows an optional variation in the rope drum construction.

Before describing the drawing in detail, it may be stated that the invention is applicable to traveling cranes or hoists which have two lateral directions of travel besides the vertical movement of the load-carrying devices, such as regular traveling shop cranes, as well as such hoists as only travel along a fixed rail.

In the drawing the regular shop crane type is shown and wherein the main supporting beam 1 is itself provided with supporting carriages at its opposite ends as at 2 rollable on rails 3 supported by the shop or building structure 4 and driven in either direction along the rails 3 by means of any desired form of motor drive indicated at 5.

Suspended on and rollable along the beam 1 are one or more trolleys, 6, each preferably provided with a motor drive 7 provided with the usual traction wheels 8 for propelling the carriages back and forth along the beam as may be desired, while suspended from the trolleys is a carriage frame 9 rotatably supporting a hoist shaft 10 on which are securely mounted winding drum means such as the several hoist drums 11, 12, 13, as well as an extra drum 14 for winding up and playing out the operator's electric control cable 15.

Drums 11 and 12 are here shown each with a hoist cable 16, 17, suspending blocks 18, 19, and hooks 20, 21, in turn suspending a pallet frame 22 on which the load 23 is carried. Whether the winding drum means consists of two or more load-carrying drums, or but one load-carrying drum, and whether fitted with hooks, slings, grabs, or electro-magnets for taking the load, is immaterial to the present invention, the double drums for the load being merely shown for purposes of illustration.

The hoist shaft 10 is driven in either direction by any desired form of motor drive and suitable reduction gearing, here indicated at 24, 25.

The third drum, 13, is of the same diameter as the other two drums, and has its own hoist rope 26 and block 27, and is only for the purpose of supporting the operator's seat or cage 28 which is especially formed to protect the operator 29 by a frame substantially surrounding him, provide an extension support 28' for his feet, yet permit his free egress and ingress for supervising or assisting in the loading and unloading of the hoist.

At a convenient point on the operator's cage are the necessary control buttons 30 for controlling all movements of the crane, as well as lifting and lowering of the load. A suitable electric cable 15 extends from the controls to a special winding drum 14 on the hoist shaft and from whence the proper distribution to the various crane motors may be made in a manner well known to any electrician and therefore not detailed on the drawing.

A particular feature of the invention is that the operator is carried adjacent the load on a separate rope operated simultaneously with the load-carrying rope or ropes. The construction shown with the drums all secured to a single shaft is the preferred form, though for smaller hoists the load-carrying and operator carrying drums may be one elongated drum as shown in Fig. 3 wherein 12' is the load-carrying drum section, 13' is the operator carrying drum section, and 14' is the electric cable drum section. Either construction insures constant relative positions of the operator and load at all times.

It is evident, however, without further drawings that the operator-carrying drum could be smaller in diameter than the hoist drum and suitably geared therefrom for similar surface speeds, also that independent drums and motors could be used if suitable means were provided to insure their synchronous operation. Also that it is immaterial to the invention broadly whether pulley blocks be used, or single or any number of ropes on each drum. Any of such manifest variations are within the purview of the invention, as well as any desired change in the trolley or carriage construction not inconsistent with the principal object of the invention, and the scope of my appended claims.

I claim:

1. A traveling hoist having a hoisting rope and load-carrying device, a second hoist rope spaced from the first rope, an operator's cage suspended from said second hoist rope adjacent the load, a winding drum for each rope, means positively insuring simultaneous operation of both ropes at all points in raising and lowering, remote control electrical connections on said cage with flexible leads therefrom for controlling all motions of said traveling hoist and said ropes, and a winding drum for said leads associated with the drum of said second hoist rope.

2. A traveling hoist having a hoisting rope and load-carrying device, a second hoist rope spaced from the first rope provided with a support suspended thereon for carrying an operator adjacent the load, remote control electrical connections accessible to an operator on said support for controlling all motions of the traveling hoist and said ropes, and means positively insuring the simultaneous operation of both ropes, whereby the operator's relation to the load will be maintained comprising drums for each rope mechanically connected together for simultaneous operation.

3. A traveling hoist having a hoisting rope and load-carrying device, a second hoist rope spaced from the first rope provided with a support suspended thereon for carrying an operator adjacent the load, remote control electrical connections accessible to an operator on said support for controlling all motions of the traveling hoist and said ropes, and means positively insuring the simultaneous operation of both ropes, whereby the operator's relation to the load will be maintained comprising separate winding drums for each rope, and a common hoist shaft to which both drums are secured.

4. A traveling hoist provided with an elongated carriage frame, a shaft rotatably supported on said frame, a plurality of load hoist drums securely mounted on said shaft, each drum provided with hoist rope and load-carrying devices thereon, a third hoist drum securely mounted on said shaft, a rope on said third drum, and an operator's support carried by said last-mentioned rope at a point adjacent a load when carried by the other ropes, and remote control devices on said support accessible to said operator arranged to control all motions of said traveling hoist.

5. In a construction as specified in claim 4, a fourth drum mounted on said shaft, and an electric cable wound thereon leading to said remote control devices on the support.

6. A traveling hoist provided with a hoisting rope and load carrying device suspended thereon, a second hoist rope spaced from the first rope provided with a support suspended thereon for carrying an operator adjacent the load, winding drum means for the ropes arranged to insure simultaneous operation of both ropes whereby the operator's relation to the load will be maintained, an electric motor arranged for operating said winding drum means, a motor arranged for bodily propelling the hoist, and remote control electrical connections accessible to an operator on said support for controlling the travel of the hoist and the winding of said ropes.

WILLIAM H. RINGE.